Figure 4:
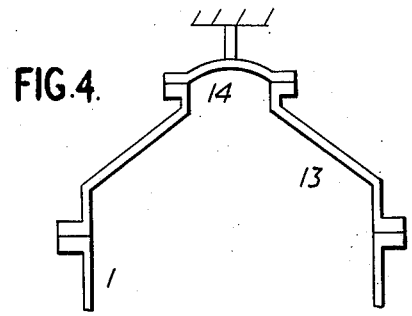

Nov. 27, 1962   A. BRAATEN ETAL   3,065,731
RING SHAPED VESSEL FOR DRYING AND IMPREGNATING
ELECTRICAL CABLES
Filed Nov. 4, 1959   2 Sheets-Sheet 1
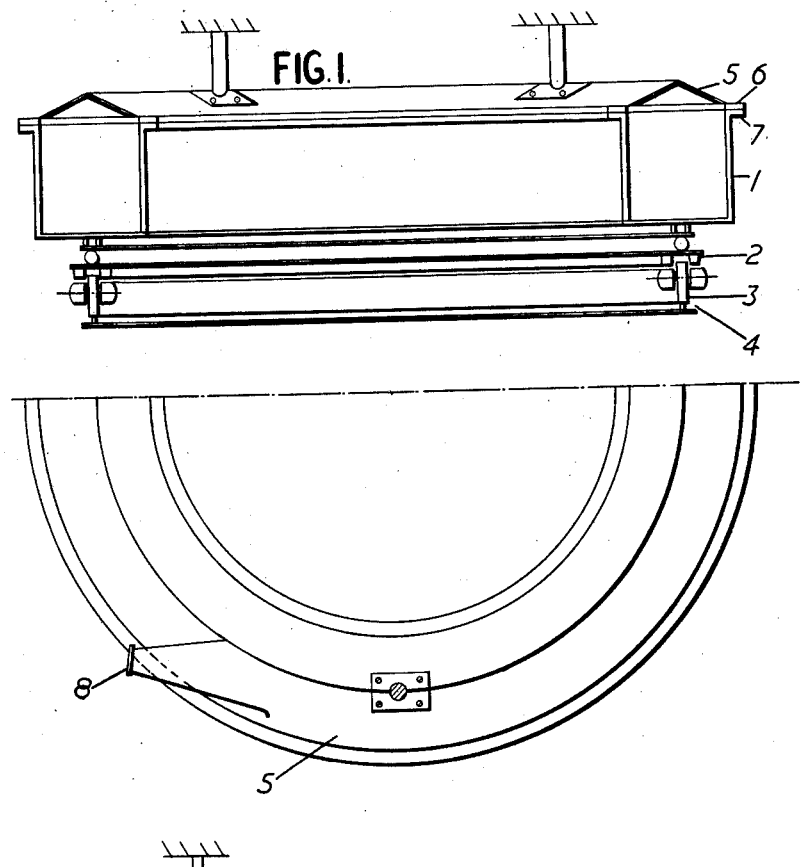
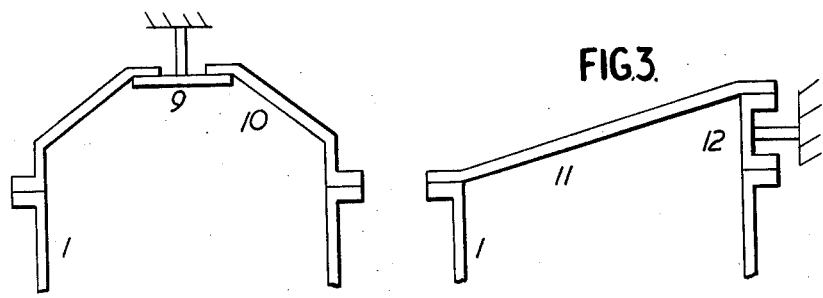
*Inventor*
A. BRAATEN -
W. WILHELMSEN -
J. N. JOHNSEN
By
*Attorney*

3,065,731
RING SHAPED VESSEL FOR DRYING AND IMPREGNATING ELECTRICAL CABLES
Amud Braaten, Fron, Oslo, Willy Wilhelmsen, Snaroya, Baerum, and John Norman Johnsen, Bryn, Oslo, Norway, assignors to International Standard Electric Corporation, New York, N.Y., a corporation of Delaware
Filed Nov. 4, 1959, Ser. No. 850,927
6 Claims. (Cl. 118—420)

The present invention relates to a ring shaped vessel for drying and impregnating electric cables.

Impregnating vessels for electric cables are previously known and these are usually made in the form of a large vessel with a lid which is vacuum-tight attached to the vessel. A cable length which is to be impregnated, is usually wound up in a portable basket o ron a drum and then placed into the vessel.

It is commonly known to heat the vessel during the process of impregnation, using steam tubes built into the walls and lid of the vessel. In recent years the cable has been heated by electrical means. When the cable is heated, the vessel is subjected to vacuum such that the moisture in the insulating paper evaporates. When the cable is sufficiently dry the vessel is filled with impregnating oil. After the impregnation process the cable is cooled off, and at a suitable temperature the lid is removed and the basket or the drum containing the impregnated cable is taken out and moved to the next stage of manufacture, which includes the process of supplying the cable with an outer sheath.

In high tension cables impregnating oil which may flow in the cable through oil ducts is employed. These types of cables are usually called oil-cables, and as oil-cables work at very high electric potential gradients, it is not considered to be safe to let the impregnated paper insulation be subjected to contact with air. It has, therefore, been common to impregnate such cables after the outer sheath has been applied.

This is a reliable and frequently used method, but the cable must then be evacuated from the ends. In order to provide very high vacuum the cable is evacuated also at the middle of the cable length, and there is thus a practical limit of the length of a cable to be impregnated in this manner. It has been proved desirable to manufacture oil-cables which are longer than what is possible with the above mentioned process of impregnating sheathed cables.

It has, therefore, been desirable to produce an impregnating vessel of a type which allows a sheath to be applied to the impregnated cable and which avoids the cable insulation or the impregnating oil being subjected to contact with air.

It has been previously known to employ a drum or a basket which is placed into a vessel and which supplies impregnated cable to a sheath press, the vessel having a tight outlet and being filled with impregnating oil while the cable is supplied with an outer sheath.

When considering oil-cables it is of great importance that the bend radius of the cable is not too small. This is particularly the case before the cable is dried and impregnated. It is, therefore, of great importance to employ a drying vessel having a large diameter. On the other hand the difficulty with large vessels is that the atmospheric pressure on the lid is very high when the vessel is under vacuum. Hence both the lid and vessel bottom must be made in the form of very heavy, and therefore very expensive structures. It is, therefore, considered to be advantageous to make the vessel in the form of a closed ring, so that the surface of the lid only covers the part of the vessel which is filled with cable only rather than the cable and sheath extruding apparatus, whereby the pressure is thus greatly reduced.

The present invention relates to a ring shaped vessel for drying and impregnating electric cables. The characteristic feature of the invention is that the vessel is arranged to rotate with respect to a stationary lid, or a stationary part of a lid or sidewall, containing one or more outlets for the cable, a tight packing (sealing) arrangement being provided to prevent leakage of oil between the stationary and rotary parts.

In order to avoid subjecting the impregnated cable to contact with air during the passage thereof from the impregnating vessel to the cable sheath extruder, the extruder is connected through an oil filled pipe to a corresponding cable outlet of the vessel. During the process of supplying the cable with an outer sheath, the cable outlet and the part of the vessel to which the outlet is connected are held stationary, while the rest of the ring shaped vessel containing the cable is rotated with respect to the stationary part.

The packing arrangement must be able to secure satisfactory and reliable high vacuum in the vessel while the vessel is held stationary during the drying of the cable, and it must be so arranged that the vessel may be rotated without much friction with respect to the fixed lid or the stationary part of the lid or sidewall which contains the cable outlet to the extruder while the vessel is filled with oil under pressure, and with negligible oil leakage from the vessel.

The invention will be described in detail in conjunction with the drawings of which, FIG. 1 shows a ring shaped vessel according to the invention, comprising a stationary lid.

FIGS. 2, 3, and 4 show alternative embodiments of the invention in which only a part of the lid or a sidewall is stationary.

Figure 5:
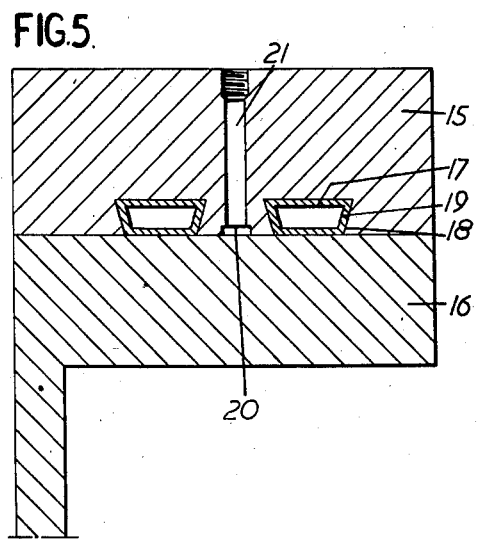
Figure 6:
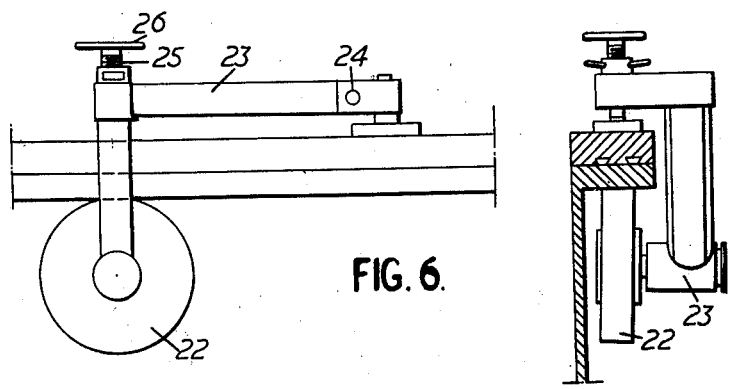

FIG. 5 shows an advantageous packing arrangement for ring shaped vessel according to the invention, and FIG. 6 shows a pulley arrangement to be used with the packing arrangement in FIG. 5.

FIG. 1 shows a ring shaped vessel for drying and impregnating an oil cable. A vessel 1 is mounted on a ring 2 having a suitable number of equally spaced wheels 3 which may roll on a ring shaped track 4, the vessel may be rotatable by means of electromotors or other suitable means (not shown). A lid 5 is held in a fixed position by suitable means while the vessel rotates. The lid must be removed when the cable is to be placed into the vessel. The means for removing the lid and the means for holding it in a fixed position are not shown. When the cable is to be dried and impregnated the lid is placed on the vessel, and vacuum is secured. A suitable packing (sealing) arrangement between flanges 6 and 7 is described below. As soon as the cable is dried the vessel is filled with impregnating oil. After the cable is impregnated the interior of the vessel must be kept under a suitable pressure to prevent air from entering and simultaneously the vessel must be rotated so that the cable may be brought out of the vessel 1 through an outlet 8 in the stationary lid 5. The outlet is vacuum tight connected to the cable sheath extruder and supplied with suitable guides for the cable. The connection to the extruder is not shown.

The lid may be kept in position by special means or it may be made so heavy that it is prevented from being lifted off the vessel when pressure is applied.

It is obvious that a plurality of different embodiments of ring shaped vessels are within the scope of the invention. Three alternative embodiments are shown in FIGS. 2, 3 and 4, in which part 1 corresponds to part 1 in FIG. 1, i.e. the rotatable part of the vessel containing the cable.

In FIG. 2 the stationary part consists of a ring 9 which actually is a part of the lid 10.

In FIG. 3 a flat lid 11 is mounted on the vessel 1 and the stationary part consists of a ring 12 which is a part of a sidewall of the vessel.

In FIG. 4 the lid is horizontally divided. A lower part 13 of the lid is mounted to the vessel 1 and an upper part 14 is fixed.

The fixed parts 9, 12 and 14 are provided with cable outlets (not shown) of the same type as the cable outlet 8 in FIG. 1.

A packing or sealing arrangement which is particularly suitable for use in connection with ring shaped vessels is shown in FIG. 5, and an advantageous pulley arrangement for keeping the lid in position is shown in FIG. 6.

A flange 15 constitutes part of a stationary lid and a flange 16 constitutes part of the rotary vessel containing the cable.

One or more slits 17 may be provided in the flange 15, into which tubular endless packing (sealing) rings 18 are introduced. These slits and packing rings may be given any desired cross-sectional area, for instance, trapezoid 19, as shown in FIG. 5. Gas or liquid under pressure is applied to the packing tube. Thus, at any time, the sealing pressure within the tube, may be adjusted, to provide uniform sealing pressure along the circumference even if the mating portions of the flanges are not quite plane. Thus, the size of the vessel will not be limited by the packing arrangement. Obviously the packing rings 18 may be fitted into slits in the flange 16 instead of in the flange 15, and a corresponding alternative combination may be employed. A ring shaped slit 20 in one or both of the flanges 15 and 16 is provided for control purposes during drying under vacuum. The slit is connected to a vacuum pump through a channel 21. With suitable measuring equipment it is possible to maintain a tight seal. Even if there should be leakage nothing will leak into the vessel as long as the leakage is balanced by the vacuum pump. This control function may also be obtained from other sealing arrangements. It may be advantageous to connect the slit 20 to gas or liquid under pressure (for instance, oil pressure) by means of a pump. The means for applying gas or liquid pressure to the packing tubes 19, and the pump connection of the slit 20 are not shown.

Because of the pressure in the vessel the lid will be subjected to large forces which will tend to lift it. To prevent this several rollers 22, FIG. 6, are provided to take up the vertical forces. The rollers 22 will roll, as shown, on the lower side of the flange of the vessel, each roller rotating about a tap which is mounted on an arm 23. This arm is pivotally mounted on the flange of the lid by a pin 24 and the arm is supplied with a screw 25 which takes up the forces. The screw 25 is supplied with a wheel 26 or other suitable means for adjusting the bias pressure, the space between the flanges, etc. FIG. 6 shows an embodiment of the pressure roller arrangement. Obviously other types of arrangements may be employed, for instance, the roller may be rotatably mounted on an extension of the vessel flange and pressed against the lid flange.

During extrusion of the cable sheath the packing pressure is adjusted to permit a suitable amount of oil to enter the region between the flanges for lubricating the sliding packing tubes 18.

What is claimed is:

1. An annular vessel for drying and impregnating cables comprising a first rotatably mounted ring shaped portion, a second stationary ring shaped portion in intimate sliding contact with said first ring shaped portion, said first and second ring shaped portion forming an annular vessel enclosure, a cable outlet connected to said second portion to permit removal of said cable from said annular enclosure in association with rotation of said first portion, and means providing a tight sliding seal between said first and second portions to prevent leakage of air into or out of said enclosure.

2. An annular vessel as set forth in claim 1 wherein said stationary second portion of said vessel comprises a removable lid for said vessel which may be removed to permit insertion of a cable to be dried and impregnated.

3. An annular vessel as set forth in claim 1 further comprising means for preventing separation of said first and second portions due to overpressure within the vessel during the impregnating of a cable.

4. An annular vessel for drying and impregnating cables comprising a first rotatably mounted ring shaped portion, a second stationary ring shaped portion in intimate sliding contact with said first ring shaped portion, said first and second ring shaped portions forming an annular vessel enclosure, a cable outlet connected to said second portion to permit removal of said cable from said annular vessel enclosure in association with rotation of said first portion, and means providing a tight sliding seal between said first and second portions to prevent leakage of air into or out of said enclosure, of said last mentioned means including concentric endless tubular packings adapted to be filled with a fluid.

5. An annular vessel as set forth in claim 4 further comprising a slit in said second stationary portion between two of said concentric endless packings and a channel in said stationary portion connected to said slit so that said slit can be evacuated during the drying of said cable to control the sealing effect of said packings and so that said packings can be lubricated during rotation of said vessel.

6. An annular vessel for drying and impregnating cables comprising a first rotatably mounted ring shaped portion, a second stationary ring shaped portion in intimate sliding contact with said first ring shaped portion, said first and second ring shaped portions forming an annular vessel enclosure, a cable outlet connected to said second portion to permit removal of said cable from said annular enclosure in association with rotation of said first portion, means providing a tight sliding seal between said first and second portions to prevent leakage of air into or out of said enclosure, and means associated with said last mentioned means for preventing separation of said first and second portions due to over pressure within said vessel during the impregnating of a cable therein, said means for preventing separation including an arm pivotally mounted at one end to one of said portions, a roller rotatably mounted on the other end of said arm and adapted to pass against the other of said portions in a direction tending to press said portions together, and regulating means in said arm for adjusting the force of compression between said portions.

References Cited in the file of this patent

UNITED STATES PATENTS

| | | |
|---|---|---|
| 1,009,731 | Fisher | Nov. 28, 1911 |
| 1,914,182 | Thordarson | June 13, 1933 |
| 2,155,771 | Porter | Apr. 25, 1939 |
| 2,605,738 | Grieve | Aug. 5, 1952 |
| 2,760,673 | Laurent | Aug. 28, 1956 |
| 2,853,047 | Walter et al. | Sept. 23, 1958 |
| 2,862,236 | Shapero | Dec. 2, 1958 |
| 2,918,925 | Dopler | Dec. 29, 1959 |

FOREIGN PATENTS

| | | |
|---|---|---|
| 545,018 | France | July 10, 1922 |
| 420,863 | Great Britain | Dec. 10, 1934 |
| 568,808 | Great Britain | Apr. 20, 1945 |